United States Patent

[11] 3,587,421

| [72] | Inventors | Shigeo Ono<br>Yokohama-shi;<br>Ichiro Hamaguchi, Tokyo, Japan |
|---|---|---|
| [21] | Appl. No. | 743,882 |
| [22] | Filed | July 10, 1968 |
| [45] | Patented | June 28, 1971 |
| [73] | Assignee | Nippon Kogaku K.K.<br>Tokyo, Japan |
| [32] | Priority | July 20, 1967 |
| [33] | | Japan |
| [31] | | 42/46357 |

[54] ELECTRIC EXPOSURE METER
7 Claims, 4 Drawing Figs.

[52] U.S. Cl.................................................. 95/10,
95/64, 324/98, 356/218
[51] Int. Cl...................................................... G01j 1/44,
G03b 7/04
[50] Field of Search............................................ 95/10 (C),
64, 640; 352/141; 356/226, 218; 324/98

[56] References Cited
UNITED STATES PATENTS

| 2,573,729 | 11/1951 | Rath.............................. | 95/10(C) |
| 3,227,056 | 1/1966 | Lieser............................ | 95/64(D)X |
| 3,383,566 | 5/1968 | Ciemniak et al............. | 95/10(C)X |
| 3,394,642 | 7/1968 | Teshi et al. .................. | 95/10(C) |

FOREIGN PATENTS

| 1,448,808 | 7/1966 | France ........................ | 352/141 |

*Primary Examiner*—Samuel S. Matthews
*Assistant Examiner*—Joseph F. Peters, Jr.
*Attorney*—Anton J. Wille ABSTRACT: An electronic exposure meter is disclosed that provides an indication of the amount of over and underexposure with a matched pointer type of meter. This is accomplished by connecting a meter across one diagonal of a bridge circuit to sense the balance thereof. The bridge circuit generally comprises a photoconductor and a diode series connected across a power source, a variable resistor and a second diode, also series connected across the current source and in parallel with the first series circuit, and the meter connected between the junctions of the series circuits.

ELECTRIC EXPOSURE METER

This invention relates to electronic exposure meters and, in particular, to electronic exposure meters of the matched-pointer type; i.e., exposure meters in which a pointer indicative of the exposure value of the subject is matched to the pointer of the exposure meter; the exposure value of the subject including such factors as film sensitivity, shutter speed and lens aperture, or f-stop setting.

In the past, it has been proposed to use a balanced bridge circuit as the measuring circuitry in an exposure meter. This approach has the decided advantage of rendering the measuring circuitry independent of voltage fluctuations of the power source. However, while the sensitivity of the bridge circuit is very great at, or very near, balance, the sensitivity deteriorates rapidly as the bridge is moved out of balance. Further, conventional bridge circuits generally use zero-center type meters so that a balanced condition is indicated even though the circuit is inactivated.

With conventional matched-pointer type exposure meters, it is not possible to determine how far off one is from proper exposure when the pointers are not matched. Thus, at best, one is obliged to make an empirical guess at what proper exposure is for difficult situations where over- or underexposure is indicated.

In view of the foregoing, it is therefore an object of the present invention to provide an exposure meter utilizing a bridge circuit having a broader range of sensitivity under off-balance conditions.

A further object of the present invention is to provide a bridge circuit exposure meter in which an unbalanced condition is indicated when the measuring circuit is deactivated.

Another object of the present invention is to provide a matched-pointer exposure meter in which the amount of over- or underexposure is indicated.

The foregoing objects are achieved in the present invention wherein there is provided a bridge circuit comprising a resistance and photoconductor series connected to form a first arm, a variable resistance as a second arm, and first and second diodes forming the third and fourth arms, respectively. The first and third arms and the second and fourth arms are series connected, respectively, across a voltage source. An indicator is connected between the junction of the first and third arms and the junction of the second and fourth arms. A broad sensitivity range near balanced bridge conditions is obtained by the above arrangement, enabling the resistance of the second arm to be adjusted so that bridge unbalance always occurs to one side of balance.

A more complete understanding of the present invention may be obtained by considering the following detailed description in conjunction with the accompanying drawing in which.

Figure 1:
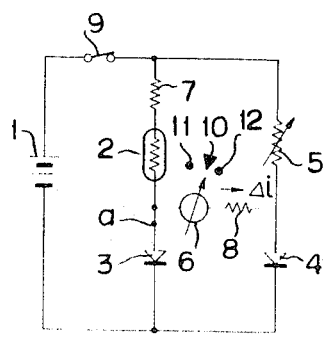
FIG. 1 shows a circuit of the exposure meter embodying the present invention.

In FIG. 1 there is shown a schematic diagram of a preferred embodiment of the present invention in which a source of operating voltage 1 is coupled by way of switch 9 to the bridge circuit comprising an exposure meter of the present invention. The bridge circuit has as its first arm photoconductor 2 series connected with resistance 7 which serves to smooth any anomalies in the characteristics of photoconductor 2. As its second arm, a variable resistance 5 which is, when the exposure meter is incorporated in the body of the camera, coupled to the means for adjusting shutter speed, f-stop and film sensitivity. The third and fourth arms of the bridge comprise diodes 3 and 4, respectively. Diodes 3 and 4 are preferably electrically matched to facilitate the operation of the bridge. Connected between the junctions of the first and third, and second and fourth arms, respectively, is an indicator 6 having series connected therewith a current limiting resistor 8 which serves to adjust the sensitivity of indicator 6. Illustrated in proximity to the pointer for indicator 6 is a scale containing indices 10, 11, and 12 whose purpose will hereinafter be more fully explained.

The overall operation of the bridge circuit may be generally described as a comparison of the resistances of the first and second arms, respectively. Resistances 5, whose adjustment arm may be coupled to the exposure determining elements in a camera, is varied until the bridge is in balance as indicated by indicator 6. The detailed discussion of the operation of the circuit illustrated in FIG. 1 may best be understood with reference to FIGS. 2 and 3.

Figure 2:
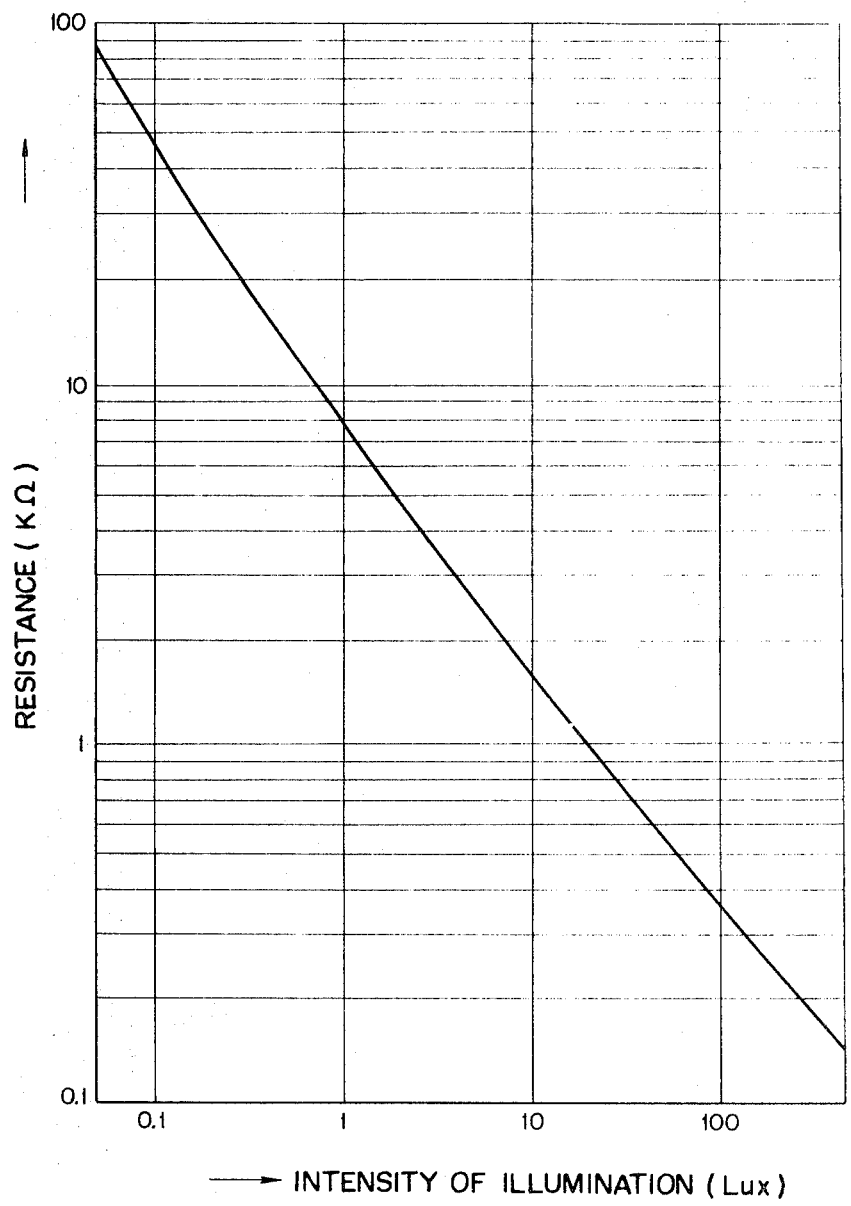
FIG. 2 is a diagram showing the intensity of illumination and resistances of photoconductive cell.
Figure 3:
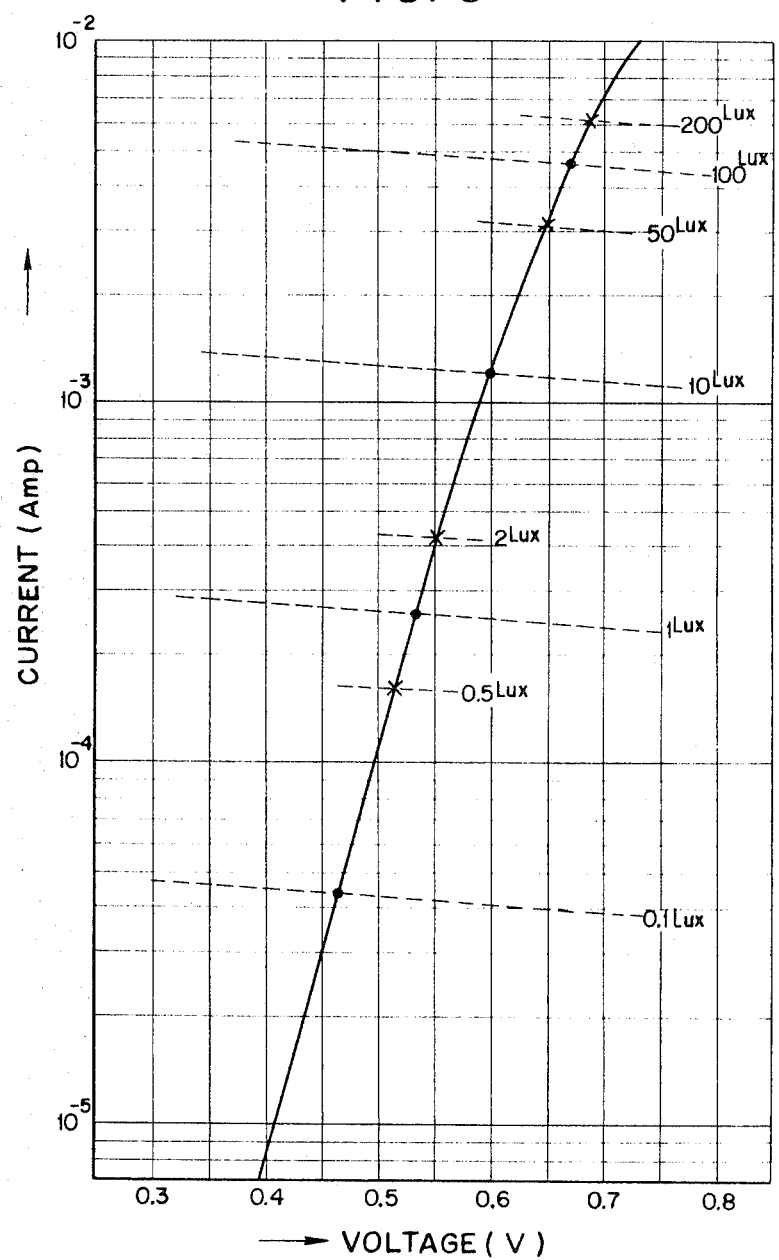
FIG. 3 is a diagram showing the voltage of diode terminal against the specific intensity of illumination on the photoconductive cell and the characteristics of voltage-and-current of the diode.

FIG. 2 represents a graph of the resistance vs. intensity of illumination characteristic of a typical, commercially available photoconductor. In FIG. 3 the solid line represents a current vs. voltage characteristic of a typical, commercially available diode.

The voltage $V_a$ of point $a$ in FIG. 1, when the bridge is in balance, is a function of the sum R of the resistances of resistor 7 and photoconductor 2. This function may be represented by the following equation:

$$V_a = V_o - R \cdot i_a \quad (1)$$

where $V_o$ is the voltage of source 1 and $i_a$ is the current passing through point $a$ in FIG. 1.

From equation (1), the relationship $i_a = (V_o - V_a)/R$ is readily obtained. When this derived equation is plotted in accordance with the intensity of illumination, the curves shown by the dashed lines in FIG. 3 are obtained. For these curves, illumination intensities of 0.1 lux, 10 lux and 100 lux, were assumed. Also assumed were a source voltage of 2.6 volts and a resistance for resistor 7 of 80 ohms. The intersection of these curves with the solid curve representing the current vs. voltage characteristic of a typical diode is marked in FIG. 3 by a series of heavy dots. The voltage coordinates of this series of dots are 0.464, 0.598, and 0.669 volts, respectively.

The relationship between these voltage values and the illumination intensities may be represented by the following equation:

$$V_a \approx K \log E + V_{ao} \quad (2)$$

where K is constant of proportionality, E is illumination intensity, and $V_{ao}$ is constant. Thus a geometric progression of exponential change of illumination intensity E is converted into an arithmetical progression or linear change in voltage $V_a$. The change in $V_a$ caused by a one f-stop change in brightness is always equal at any brightness. Therefore, when the resistance of variable resistance 5 is set equal to sum resistance R, the variation in the current $\Delta i$ passing through indicator 6 with respect to change in illumination intensity becomes uniform over all of the measuring range.

In FIG. 3, the equation $i_a = V_o - V_a/R$ has also been plotted for the illumination intensity of values of 200, 50, 2, and 0.5 lux. The intersection of this set of curves with the solid line is designated by a small $x$. As can be seen from the values chosen, these intersections represent a ±1 f-stop variation about the 1 and 100 lux intensity levels. The voltage coordinates of these points are 0.688, 0.649, 0.551, and 0.515 volts, respectively. If the sum of internal resistance of indicator 6 and series resistor 8 is assumed to be 3 kilohms, the variation in current for a ±f-stop variation in illumination intensity can be shown to be equal to +6.3μA, −6.7μA at 100 lux, and +6.3μA at 1 lux. Thus, it can be seen that the variation in current for a ±1 f-stop variation in illumination intensity is fairly uniform over a rather large range of illumination intensity.

If a photoconductor, whose characteristic curve has a smaller slope than that illustrated in FIG. 2, is used, it is possible to make the sensitivity of the exposure meter substantially constant for a much wider range. Thus, it is possible to add indices 11 and 12 showing the degree of unbalance on both sides of balance index 10.

By virtue of the wide measurement range of an exposure meter in accordance with the present invention, it is possible to eliminate an indication of a balanced condition when the exposure meter is deactivated. This is achieved by offsetting the adjustment of variable resistor 5 from the proper exposure set by the exposure control apparatus within the camera. When this is done, indicator 6 may be of the type in which the pointer is moved only in one direction from zero position. Further, when such a modification is made, indicator 6 may be of the type utilizing a flashing lamp as an indication of proper, over or under exposure.

Figure 4:
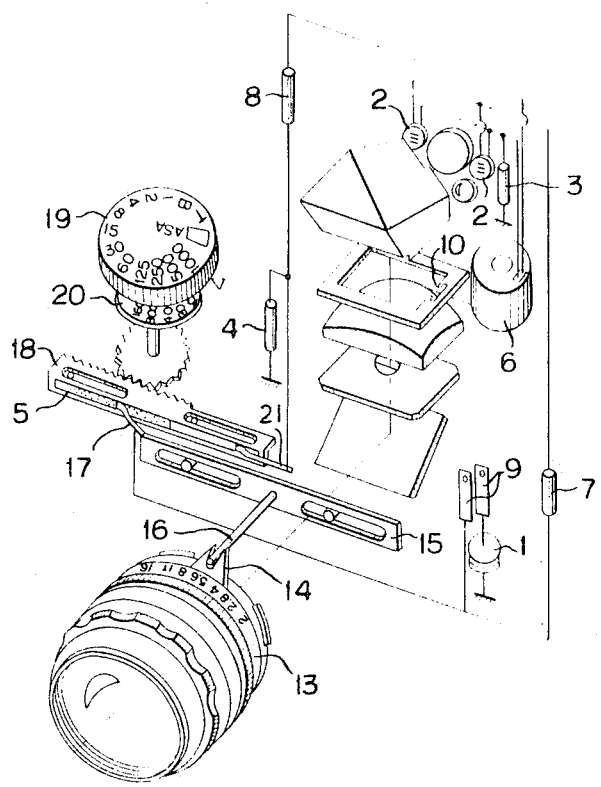
FIG. 4 is a perspective view of an embodiment in which this invention is applied to an interlocked exposure meter.

FIG. 4 illustrates the incorporation of the present invention into a camera employing an exposure meter interlocked with an exposure control mechanism of the camera. Specifically, f-stop ring 13 of an interchangeable lens is coupled to a slider 15 within the camera body by slotted arm 14 and pin 16. Slider 15 actuates wiper arm 17 which is in contact with variable resistance 5. Wiper arm 17 provides a contact between variable resistor 5 and the remainder of the bridge circuit whose components bear the same reference numerals in FIG. 4 as they do in FIG. 1. Variable resistance 5 is supported by a moveable plate 18 that may also be slidable within the camera body. The movement of plate 18 is controlled by a coupling to film sensitivity ring 20 which is in turn connected to a shutter speed adjusting ring 19 by means of a clutch mechanism. Wiper arm 21 provides a contact connecting one end of variable resistor 5 into the rest of the bridge circuitry.

The operation of the structure illustrated in FIG. 4 is the same as that described in connection with FIG. 1. The resistance of variable resistor 5 is varied in an interlocking operation with the f-stop and shutter speed setting controls while taking into consideration the film sensitivity. When the pointer of indicator 6 is matched with index 10, it is noted that the f-stop and shutter speed have been adjusted to give proper exposure.

While a preferred embodiment of the present invention has been shown and described, it will be apparent to those of skill in the art that many modifications may be made without departing from the spirit and scope of the present invention. For example, although the present invention has been described as an exposure meter interconnected to the exposure controls of the camera, the present invention may be used equally as well in a separate exposure meter wherein variable resistor 5 is merely interconnected to a set of dials indicating film sensitivity, shutter speed, and f-stop.

We claim:

1. A four arm bridge-type exposure meter comprising:
   a photoconductive element as a first arm of said bridge;
   a variable resistor, whose variations in resistance correspond to variations in exposure value, as a second arm of said bridge;
   a first diode as the third arm of said bridge; said third arm being series connected with said first arm;
   a second diode as the fourth arm of said bridge, said fourth arm being series connected with said second arm;
   a source of operating potential having first and second terminals;
   said first and second diodes being connected together and coupled to said first terminal;
   said first and second arms being connected together and coupled to said second terminal; and
   indicator means coupled to the junctions of said first and third arms and said second and fourth arms, respectively, for indicating the voltage therebetween.

2. An exposure meter as set forth in claim 1 wherein said indicator means comprises a pointer and a scale associated therewith having an index mark thereon for indicating correct exposure, said index mark being so positioned that it is aligned with said pointer when the voltage across said indicator means becomes zero.

3. An exposure meter as set forth in claim 2 wherein said scale includes additional index marks indicative of the amount of over- or underexposure.

4. An exposure meter as set forth in claim 1 wherein said indicator means comprises a pointer and a scale associated therewith having an index mark thereon for indicating correct exposure, said index mark being so positioned that it is aligned with said pointer when the voltage across said indicator means is of a predetermined, nonzero value.

5. An exposure meter as set forth in claim 4 wherein said scale includes additional index marks indicative of the amount of over- or underexposure.

6. An exposure meter as set forth in claim 1 further comprising means for coupling said variable resistor to the exposure control mechanism of a camera.

7. An exposure meter as set forth in claim 1 further comprising:
   a current limiting resistor in series with said indicator means for controlling the sensitivity thereof; and
   wherein said first arm further comprises a resistor in series with said photoconductive element.